United States Patent Office 2,920,970
Patented Jan. 12, 1960

2,920,970

CARBONACEOUS COMPONENT FOR FOUNDRY MOLDING SAND

Edward H. King, Cincinnati, Ohio, Richard W. Heine, Madison, Wis., and Joseph S. Schumacher, Cincinnati, Ohio, assignors to The Hill & Griffith Company, Cincinnati, Ohio, a corporation of Ohio No Drawing. Application May 29, 1957
Serial No. 662,351

5 Claims. (Cl. 106—38.5)

This invention relates to foundry molding sands and particularly to carbonaceous additives for such sands. Foundry molding sands in general comprise various mixtures of silica grains and clay particles to which may be added a wide variety of carbonaceous materials such as seacoal, gilsonite, high melting point coal tar pitch, asphalt, lignin, sawdust, wood flour, dextrine, farinaceous flour and gelatinized starch.

These carbonaceous additives, when utilized in various combinations or proportions in a built or synthetic molding sand, impart molding and packing characteristics to the sand which are different from those which the sand would otherwise have, and also, determine to a substantial extent the physical and chemical, or "thermal" reaction of the mold when the hot metal is poured into it, as well as the green strength and dry strength of the mold. Although there are innumerable theories as to chemical and physical reactions of the various carbonaceous ingredients of molding sand when the metal is poured, the variety of the molding problems and the variety of the available carbonaceous additives has made it difficult to formulate theories of any substantial scope as to proper blending practices. On this account, the selection of specific molding sand compositions for specific purposes has depended, for the most part, on empirical experiences and preferences which have developed in each particular foundry.

The carbonaceous additive for foundry molding sands to which the present invention is directed is treated furfural residue which may be used in molding sands in various amounts, for instance, from substantially .25% to 5%. Furfural residue is a partially carbonized cellulosic material which is essentially acidic in its chemical reaction. Furfural residue is recovered from the manufacture of furfural and comprises approximately equal portions of soft carbon and cellulose. A typical furfural residue is that resulting from the manufacture of furfural according to the process described in United States Patent No. 1,735,084, issued November 12, 1929. Obviously, various cellulosic materials may be subjected to conditions of temperature and acidity to provide a mixture of soft carbon and cellulose which is the equivalent of the furfural residue which is a by-product of the manufacture of furfural. Thus, the term "furfural residue" as used herein is intended to comprehend the members of a general class of acidic partially carbonized celluloses which are physically and chemically the substantial equivalents of the by-product residue of the process of said Patent No. 1,735,084.

Furfural residue has been used in foundry molding sands for some time past. A specific manner of using furfural residue is disclosed in United States Patent No. 2,644,741, issued July 7, 1953, on the application of King and Schumacher. This patent discloses the use of furfural residue blended with a bituminous plastic. However, furfural residue need not be blended with bituminous plastic and in many cases has been used independently as a component in a variety of foundry sand mixes.

The present invention is based on the discovery and determination that the desirable properties and action of furfural residue in a molding sand formula are enhanced if, substantially prior to the incorporation of the furfural residue in the sand mix, the furfural residue has been treated with an alkali such as soda ash or lime to adjust the pH of the furfural residue to a higher value, such as substantially 5–9. The mere addition of soda ash or lime to the sand mix at the time it is made does not provide the same result.

The initial pH of the furfural residue normally runs between 2½ and 4. The pH of the furfural residue should be adjusted to the desired range by treatment prior to the time of use with ½–7½% sodium carbonate or ¼–4% lime. This neutralization or partial neutralization of the furfural residue modifies the chemical composition of the furfural residue, increases the percentage of water soluble components in the furfural residue and renders the furfural residue more ionically active whereby the dry strength of the mold is increased without increasing the overall pH of the molding sand mix to such a degree that the mix becomes sticky or resistant to packing.

More specifically, a good foundry molding sand should have a variety of desirable qualtities including flowability, green strength, dry strength, and resistance to thermal shock. As indicated, the choice of ingredients for the sand mix depends upon the materials available, their price, and the nature of the casting to be made. Hence an almost infinite variety of molding sand mixtures have been used and are used in the various foundries throughout the country. The neutralized, or partly neutralized furfural residue of the present invention may be used as a component of almost any of the foundry sand mixes to supply the required carbonaceous component in whole or in part.

In general, the dry strength of the sand mold depends upon the thoroughness of the dispersion of the clay particles among the silica grains. In general, alkalinity tends to increase and promote this desired dispersion of the clay particles. However, alkalinity has the disadvantage of rendering the mixture sticky, of decreasing the flowability of the mix, and rendering it more difficult to compact the mix properly about the pattern. The alkalinized furfural residue of the present invention promotes the dispersion of the clay particles as desired, but without imparting stickiness to the mix or increasing the difficulty of molding the sand to the desired configuration. While this phenomenon cannot be certainly explained on the basis of present theory, it is believed to be due to ion exchange phenomena which take place between the sodium or calcium components of the treated furfural residue and the calcium or sodium components of the clay. In general, the bentonites and fire clays are used in foundry molding sands. The degree of neutralization of the residue should be calculated and related to the alkalinity or acidity of the clay to provide a pH of substantially 5½–9 for the final molding sand composition.

The treated furfural residue is a very valuable component in foundry molding sands. Usually these sands are used over and over again and with each use a fraction is discarded and a new fraction added to replace it whereby any given mix is constituted by a major portion which has been subjected to the casting temperature and a minor portion which has not. The furfural residue when subjected to the intense heat of the casting tends to convert to activated charcoal which is a highly valuable component in the sand mix, although far too expensive to be purchased and used as such.

The water soluble component of the treated furfural residue is believed to be particularly effective for providing a desirable particle binding action when first used and reducing to a particularly fine carbonaceous material during the course of repeated uses. This water soluble component of the treated furfural residue may approximate 20% of the furfural residue by weight, if the soda ash or lime is added to the residue and the residue is stored for a period of from several days to a week at room temperature. For special purposes, however, the furfural residue may be boiled with the soda ash or lime for a period of substantially two hours in which case the percent of water soluble organic components, exclusive of the basic chemical added, may increase to substantially 50% by weight.

The degree to which it is desirable to neutralize the furfural residue and the degree to which it is desirable to render the furfural residue water soluble depends entirely upon the desired characteristics of the molding sand mix and on the character of the other ingredients of the mix. For instance, greater neutralization is desirable if the furfural residue is to be used with a southern bentonite or fire clay than if it is to be used with most western bentonites, which are in and of themselves more alkaline. The properly alkalinized furfural residue imparts more desirable characteristics to the molding sand than the untreated furfural residue, particularly in respect to the dry strength of the mold and the development of a very fine char in the used sand. Examples of properly alkalinized furfural residues are as follows:

Example 1

| | Percent |
|---|---|
| Furfural residue | 99 |
| Calcined lime | 1 |
| | 100 |

This changes the pH of furfural residue from 3 to 5 pH.

Example 2

| | Percent |
|---|---|
| Furfural residue | 98 |
| Soda ash | 2 |
| | 100 |

This changes the pH of furfural residue from 3 to 5 pH.

Example 3

| | Percent |
|---|---|
| Furfural residue | 98½ |
| Calcined lime | 1½ |
| | 100 |

This changes the pH of furfural residue from 3.1 to 6.9.

Example 4

| | Percent |
|---|---|
| Furfural residue | 96 |
| Soda ash | 4 |
| | 100 |

This change the pH of furfural residue from 2.9 to 6.6.

Example 5

| | Percent |
|---|---|
| Furfural residue | 97 |
| Calcined lime | 3 |
| | 100 |

This changes the pH of furfural residue from 3.1 to 9.

Example 6

| | Percent |
|---|---|
| Furfural residue | 93 |
| Soda ash | 7 |
| | 100 |

This changes the pH of furfural residue from 2.9 to 7.9.

Furfural residues of the type disclosed in Examples 1 through 6 may be added to built foundry molding sand at the time of admixture to constitute in whole or in part the carbonaceous component of the molding sand. The amount of treated furfural residue added to the molding sand mix may be in the range of substantially .25% to 5%.

In general, built foundry molding sands comprise substantially 80–92% sand, 5–15% clay, 1–10% carbonaceous additive, and 3–8% water. However, these ranges are by no means rigid and at most may be said to embrace a great majority of the built foundry molding sand formulae which are in use. Frequently special molding sands which are outside of this range are compounded to take advantage of the properties of specific raw maetrials, perhaps locally available, and/or idiosyncrasies of the particular casting which is to be made in the mold. However, for the purpose of illustrating conventional utilizations of the present invention the following formulae for built foundry molding sands are provided:

Example 7

| | Percent |
|---|---|
| Sand | 92 |
| Western bentonite | 6 |
| Treated furfural residue (2% soda ash), 5 pH | 2 |
| | 100 |
| Water | 4 |

Resultant pH of mix—6.8 pH.

Example 8

| | Percent |
|---|---|
| Sand | 88 |
| Western bentonite | 6 |
| Seacoal | 4 |
| Treated furfural residue (2% calcined lime), 7.6 pH | 2 |
| | 100 |
| Water | 4.6 |

Resultant pH of mix—8.0 pH.

Example 9

| | Percent |
|---|---|
| Sand | 87½ |
| Western bentonite | 6 |
| Seacoal | 3 |
| Pulverized bitumen | 1½ |
| Treated furfural residue (2% soda ash), 5 pH | 2 |
| | 100 |
| Water | 4.8 |

Resultant pH of mix—6.6 pH.

Example 10

| | Percent |
|---|---|
| Sand | 88 |
| Southern bentonite | 8 |
| Treated furfural residue (4% soda ash), 6.6 pH | 2 |
| Seacoal | 2 |
| | 100 |
| Water | 4 |

Resultant pH of mix—6.3 pH.

Example 11

| | Percent |
|---|---|
| Sand | 90 |
| Southern bentonite | 8 |
| Treated furfural residue (4% soda ash), 6.6 pH | 2 |
| | 100 |
| Water | 3.8 |

Resultant pH of mix—6.2 pH.

Example 12

| | |
|---|---|
| Sand | 90 |
| Southern bentonite | 6 |
| Asphaltic bitumen | 2 |
| Treated furfural residue (2% calcined lime), 7.4 pH | 2 |
| | 100 |
| Water | 4 |

Resultant pH of mix—7 pH.

Example 13

| | |
|---|---|
| Sand | 85 |
| Fireclay | 12 |
| Treated furfural residue (6% soda ash), 7.8 pH | 3 |
| | 100 |
| Water | 6 |

Resultant pH of mix—7.1 pH.

Example 14

| | |
|---|---|
| Sand | 84 |
| Fireclay | 12 |
| Treated furfural residue (6% soda ash), 7.8 pH | 1 |
| Wood flour | 1 |
| Seacoal | 2 |
| | 100 |
| Water | 6.5 |

Resultant pH of mix—6.8 pH.

Example 15

| | |
|---|---|
| Sand | 79½ |
| Fireclay | 15 |
| Treated furfural residue (6% soda ash), 7.8 pH | 1 |
| Pitch or bitumen | 4 |
| Wood flour | ½ |
| | 100 |
| Water | 7.1 |

Resultant pH of mix—6.5 pH.

All percentages in the preceding formulae are by weight.

Having described our invention, we desire to be limited only to the following claims:

1. A carbonaceous material adapted to constitute in whole or in part the carbonaceous component of a built foundry molding sand comprising silica particles and dispersed clay, said carbonaceous material consisting essentially of a mixture of furfural residue having a pH in the range of 2½–4 and an alkali of the class consisting of soda ash and lime in an amount sufficient to elevate the pH of the mixture to the range of 5–9.

2. A built foundry molding sand comprising 80–92% sand, 5–15% clay, 1–10% carbonaceous additive, and 3–8% water, said carbonaceous additive including .25%–5% of the treated furfural residue of claim 1 based on the weight of the total sand mixture.

3. The built foundry molding sand of claim 2 wherein the clay is western bentonite.

4. The built foundry molding sand of claim 2 wherein the clay is southern bentonite.

5. The built foundry molding sand of claim 2 wherein the clay is fireclay.

References Cited in the file of this patent

UNITED STATES PATENTS

| | | |
|---|---|---|
| 1,673,356 | Hanley | June 12, 1928 |
| 1,735,084 | Miner et al. | Nov. 12, 1929 |
| 1,752,838 | Crossman | Apr. 1, 1930 |
| 2,319,883 | Ritchie | May 25, 1943 |
| 2,556,334 | Moser | June 12, 1951 |
| 2,644,741 | King et al. | July 7, 1953 |

OTHER REFERENCES

Dunlop et al.: "The Furans" (pub. 1953 Reinhold) (pages 275, 287).

Sutermeister: "The Chemistry of Pulp and Paper Making" (pub. 1941, Wiley) (page 214).